(12) United States Patent
Moore et al.

(10) Patent No.: US 12,479,348 B2
(45) Date of Patent: Nov. 25, 2025

(54) MAINTENANCE VEHICLE WITH A HOPPER ASSEMBLY

(71) Applicant: EXMARK MANUFACTURING COMPANY INCORPORATED, Beatrice, NE (US)

(72) Inventors: Jeffrey J. Moore, Beatrice, NE (US); Kyler J. Macy, Marysville, KS (US); Rodney Lanik, Hickman, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 874 days.

(21) Appl. No.: 17/694,435

(22) Filed: Mar. 14, 2022

(65) Prior Publication Data
US 2022/0314862 A1 Oct. 6, 2022

Related U.S. Application Data

(60) Provisional application No. 63/169,355, filed on Apr. 1, 2021.

(51) Int. Cl.
*B60P 1/56* (2006.01)
*B62D 51/02* (2006.01)

(52) U.S. Cl.
CPC ............ *B60P 1/56* (2013.01); *B62D 51/02* (2013.01)

(58) Field of Classification Search
CPC ... B62D 51/02; B60P 1/56; B60P 1/04; A01C 7/125; A01C 15/003; A01C 15/006; B62B 3/08
(Continued)

(56) References Cited

U.S. PATENT DOCUMENTS 4,588,133 A     5/1986   Brabb et al.
4,898,333 A *   2/1990   Kime ................ E01C 19/201
                                                37/234

(Continued)

FOREIGN PATENT DOCUMENTS

DE        4026032 A1    1/1992

OTHER PUBLICATIONS

"Allen Introduces the All-New AW16E Fully Electric Wheel Buggy," Concrete Equipment News, Feb. 10, 2020, Retrieved from the Internet: <URL:https://www.alleneng.com/allen-news/allen-introduces-all-new-aw16e-fully-electric-wheel-buggy>, 2 pages.
(Continued)

*Primary Examiner* — Daniel J Colilla
*Assistant Examiner* — Philip Charles Adams
(74) *Attorney, Agent, or Firm* — Mueting Raasch Group

(57) ABSTRACT

The technology disclosed herein relates to a maintenance vehicle. The vehicle has a vehicle frame, drive wheels rotatably coupled to the vehicle frame and a prime mover coupled to the vehicle frame. The prime mover is in operative communication with the drive wheels. A hopper assembly is pivotably coupled to the vehicle frame. The hopper assembly has a hopper having a discharge opening and a spreader disk adjacent to the discharge opening. The hopper assembly is pivotable about a pivot axis between a maintenance position and an operating position. The spreader disk is positioned vertically below the discharge opening when the hopper assembly is in an operating position.

21 Claims, 3 Drawing Sheets

(58) Field of Classification Search
USPC .................. 298/27, 19 R, 1 C; 239/650, 657
See application file for complete search history.

(56) References Cited

U.S. PATENT DOCUMENTS

| | | | | | |
|---|---|---|---|---|---|
| 5,333,795 | A | * | 8/1994 | Jessen | .................... A01C 15/02 |
| | | | | | 239/685 |
| D534,044 | S | | 12/2006 | Zak | |
| D602,046 | S | | 10/2009 | Choi et al. | |
| 8,262,104 | B2 | | 9/2012 | Kallevig et al. | |
| 10,499,559 | B2 | | 12/2019 | Stewart et al. | |
| 11,440,574 | B2 | * | 9/2022 | Foreman | ................. B62B 5/003 |
| 2001/0040405 | A1 | * | 11/2001 | Jansen | .................... B60P 1/162 |
| | | | | | 298/1 C |
| 2010/0003872 | A1 | * | 1/2010 | Jessen | ................. B62D 11/006 |
| | | | | | 440/12.5 |
| 2012/0146386 | A1 | * | 6/2012 | Rowlands | ................. B62B 3/08 |
| | | | | | 180/19.1 |
| 2016/0316615 | A1 | * | 11/2016 | Papke | ................. A01C 17/005 |
| 2017/0190275 | A1 | | 7/2017 | Helmsderfer et al. | |

OTHER PUBLICATIONS

Gamberini, "Fertilizer Spreader Gamberini SPW 1200 Carried with Tilting Rectangular Hopper and Double Disc Distributor," Jan. 2021, Retrieved from the Internet: <URL: https://coltradeshop.com/en/fertilizer-spreader/1306-fertilizer-spreader-gamberini-spw-1200-carried-with-tilting-rectangular-hopper-and-double-disc-distributor.html>, 7 pages.

Lely USA, Inc., Operator's Manual—H/L1250/L1500/L2010, 2005, 46 pages.

Trynex International, TURFEX Owner/Operator's Manual for Models MS-1875 and MS-2000, 2008, 44 pages.

* cited by examiner

MAINTENANCE VEHICLE WITH A HOPPER ASSEMBLY

This application claims the benefit of U.S. Provisional Application No. 63/169,355, filed 1 Apr. 2021, the disclosure of which is incorporated by reference herein in its entirety.

TECHNICAL FIELD

The present technology generally relates to a maintenance vehicle. More particularly, the present technology relates to configurations of maintenance vehicles having a hopper assembly.

SUMMARY

Some embodiments of the technology disclosed herein relate to a maintenance vehicle. The maintenance vehicle has a vehicle frame and drive wheels rotatably coupled to the vehicle frame. A prime mover is coupled to the vehicle frame, where the prime mover is in operative communication with the drive wheels. A hopper assembly has a hopper having a loading opening and a discharge opening. The hopper assembly is pivotably coupled to the vehicle frame. The hopper assembly is pivotable about a pivot axis between a maintenance position and an operating position.

In some such embodiments, the maintenance vehicle has a control panel fixed to the vehicle frame and a hopper controller fixed relative to the hopper. The control panel is in operative communication with the prime mover. The hopper controller is adjacent the control panel when the hopper is in the operating position and the hopper controller is distant from the control panel when the hopper is in the maintenance position. Additionally or alternatively, the hopper assembly has a hopper frame, where the hopper is coupled to the hopper frame and the hopper frame is coupled to the vehicle frame and is pivotable about the pivot axis between the maintenance position and the operating position.

Additionally or alternatively, the vehicle has a standing platform coupled to the vehicle frame, where the standing platform adapted to support a standing operator. Additionally or alternatively, the maintenance position is at least 45 degrees from the operating position. Additionally or alternatively, the hopper assembly extends over the prime mover in the operating position and the hopper assembly exposes the prime mover in the maintenance position. Additionally or alternatively, the hopper controller is configured to adjust a rate of release of a bulk material from the hopper.

Additionally or alternatively, the pivot axis extends across a front end of the maintenance vehicle. Additionally or alternatively, the hopper assembly is configured to pivot in a forward direction relative to the maintenance vehicle. Additionally or alternatively, the hopper has a front end and a rear end and a hopper volume extending between a top end and a bottom end, where the hopper volume is asymmetric and has a center of gravity that is closer to the rear end than the front end. Additionally or alternatively, the top end defines the loading opening. Additionally or alternatively, the bottom end defines the discharge opening.

Additionally or alternatively, hopper has a front inclined sidewall and a rear inclined sidewall, wherein the slope of the rear inclined sidewall is less than the opposite of the slope of the front inclined sidewall. Additionally or alternatively, the maintenance vehicle is a zero radius turn vehicle. Additionally or alternatively, the vehicle has a spreader disk adjacent to the discharge opening, where the spreader disk is positioned vertically below the discharge opening when the hopper assembly is in an operating position. Additionally or alternatively, the spreader disk is fixed to the hopper such that the spreader disk is configured to pivot with the hopper.

Some embodiments of the technology disclosed herein relates to a maintenance vehicle having a vehicle frame and drive wheels rotatably coupled to the vehicle frame. A prime mover is coupled to the vehicle frame, where the prime mover is in operative communication with the drive wheels. A standing platform is coupled to the vehicle frame, the standing platform adapted to support a standing operator. A control panel is fixed to the vehicle frame, where the control panel is in operative communication with the prime mover. A hopper assembly has a hopper coupled to the vehicle frame. The hopper has a front end and a rear end and a hopper volume extending between a top end and a bottom end. The hopper volume is asymmetric and has a center of gravity that is closer to the rear end than the front end.

In some such embodiments, the hopper assembly is pivotably coupled to the vehicle frame, where the hopper assembly is pivotable about a pivot axis between a maintenance position and an operating position. Additionally or alternatively, the vehicle has a hopper controller fixed relative to the hopper, where the hopper controller is in operative communication with the hopper assembly, and the hopper controller is adjacent the control panel when the hopper is in the operating position and the hopper controller is distant from the control panel when the hopper is in the maintenance position. Additionally or alternatively, the maintenance position is at least 45 degrees from the operating position.

Additionally or alternatively, the hopper assembly obstructs the prime mover in the operating position and the hopper assembly exposes the prime mover in the maintenance position. Additionally or alternatively, the hopper controller is configured to adjust a rate of release of a bulk material from the hopper. Additionally or alternatively, the pivot axis extends across a front end of the maintenance vehicle. Additionally or alternatively, the hopper assembly is configured to pivot in a forward direction relative to the maintenance vehicle. Additionally or alternatively, the hopper has a front inclined sidewall and a rear inclined sidewall, where the slope of the rear inclined sidewall is less than the opposite of the slope of the front inclined sidewall. Additionally or alternatively, the maintenance vehicle is a zero radius turn vehicle. Additionally or alternatively, the hopper defines a loading opening and a discharge opening. Additionally or alternatively, the vehicle has a spreader disk adjacent to the discharge opening, where the spreader disk is positioned vertically below the discharge opening when the hopper assembly is in an operating position. Additionally or alternatively, the spreader disk is fixed to the hopper.

Some embodiments relate to a maintenance vehicle having a vehicle frame and drive wheels rotatably coupled to the vehicle frame. A prime mover is coupled to the vehicle frame. The prime mover is in operative communication with the drive wheels. The vehicle has a spreader device having a hopper assembly with a hopper. The hopper assembly is pivotably coupled to the vehicle frame. The hopper assembly is pivotable about a pivot axis between a maintenance position and an operating position.

In some such embodiments, the spreader device is a broadcast spreader. Additionally or alternatively, the spreader device is a drop spreader. Additionally or alternatively, the vehicle has a control panel fixed to the vehicle frame, where the control panel is in operative communication with the prime mover. A hopper controller is fixed relative to the hopper, where the hopper controller is adjacent the control panel when the hopper is in the operating position and the hopper controller is distant from the control panel when the hopper is in the maintenance position. Additionally or alternatively, the hopper assembly has a hopper frame, where the hopper is coupled to the hopper frame, the hopper frame is coupled to the vehicle frame, and the hopper frame is pivotable about the pivot axis between the maintenance position and the operating position. Additionally or alternatively, the vehicle has a standing platform coupled to the vehicle frame where the standing platform adapted to support a standing operator.

Additionally or alternatively, the maintenance position is at least 45 degrees from the operating position. Additionally or alternatively, the hopper assembly extends over the prime mover in the operating position and the hopper assembly exposes the prime mover in the maintenance position. Additionally or alternatively, the hopper controller is configured to adjust a rate of release of a bulk material from the hopper. Additionally or alternatively, the pivot axis extends across a front end of the maintenance vehicle. Additionally or alternatively, the hopper assembly is configured to pivot in a forward direction relative to the maintenance vehicle. Additionally or alternatively, the hopper has a front end and a rear end and a hopper volume extending between a top end and a bottom end, where the hopper volume is asymmetric and has a center of gravity that is closer to the rear end than the front end. Additionally or alternatively, the hopper further has a front inclined sidewall and a rear inclined sidewall, where the slope of the rear inclined sidewall is less than the opposite of the slope of the front inclined sidewall. Additionally or alternatively, the maintenance vehicle is a zero radius turn vehicle.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
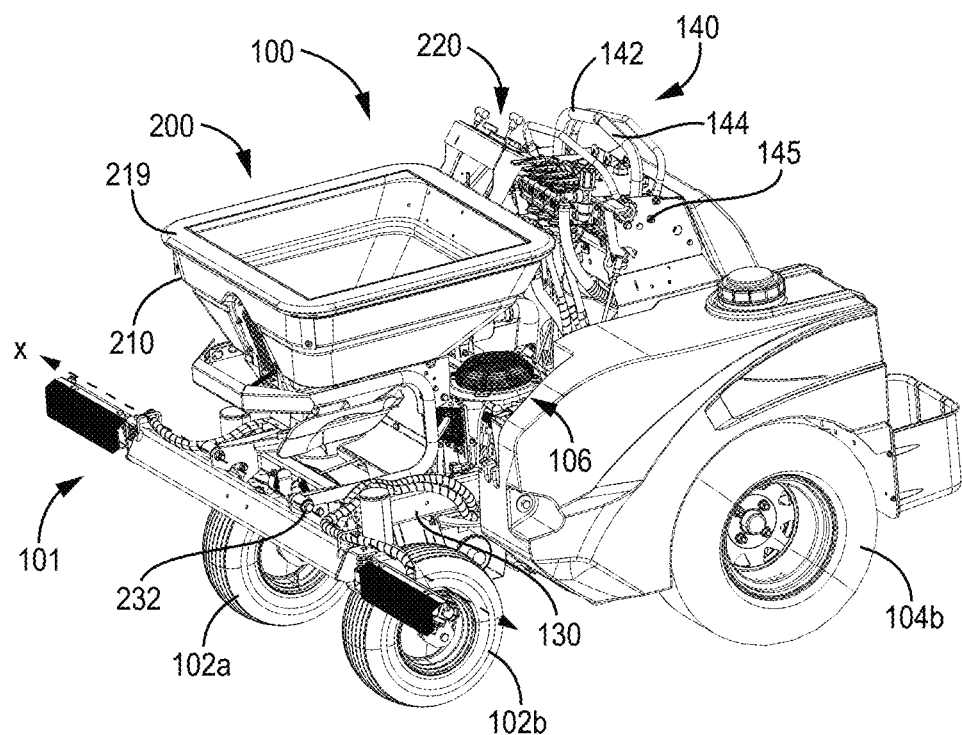
FIG. 1 is a first perspective view of an example implementation of the technology disclosed herein in a maintenance vehicle.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

Figure 3:
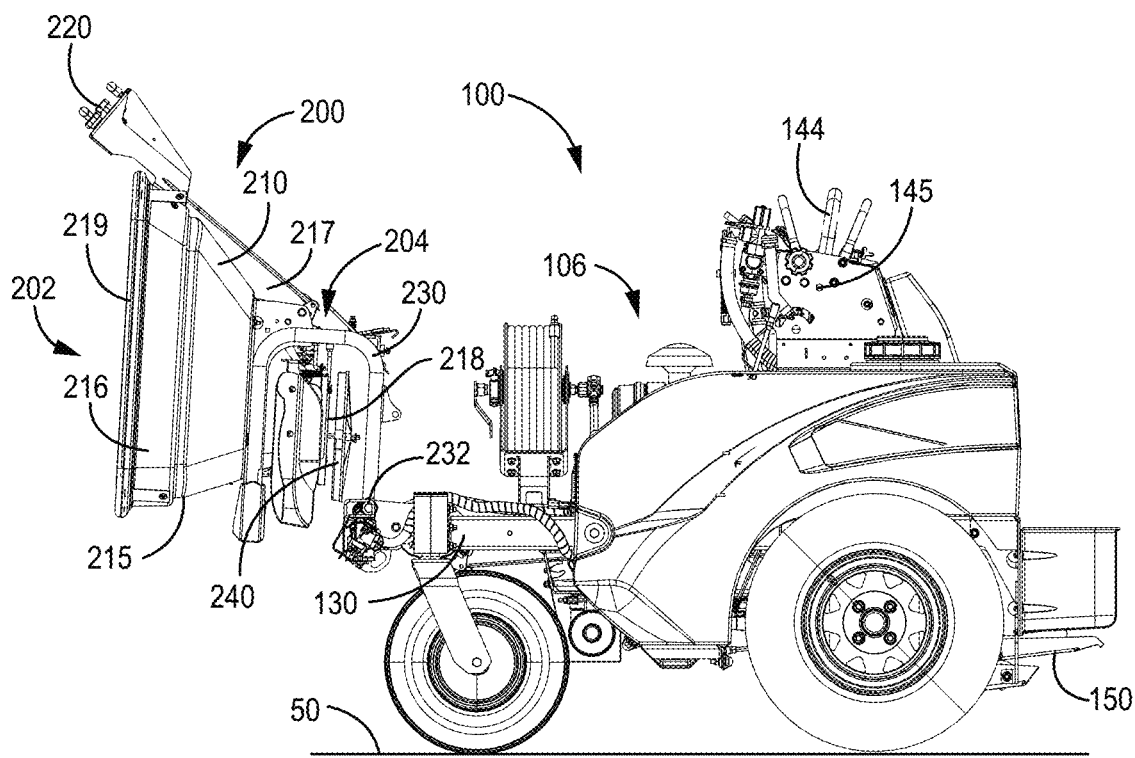
FIG. 3 is a side view of the example implementation of FIG. 1.

It is noted that the terms "have," "include," "comprise," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle 100 is in an operating configuration (e.g., while the vehicle 100 is positioned such that wheels 102 and 104 rest upon a generally horizontal ground surface 50 as shown in FIG. 3). These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
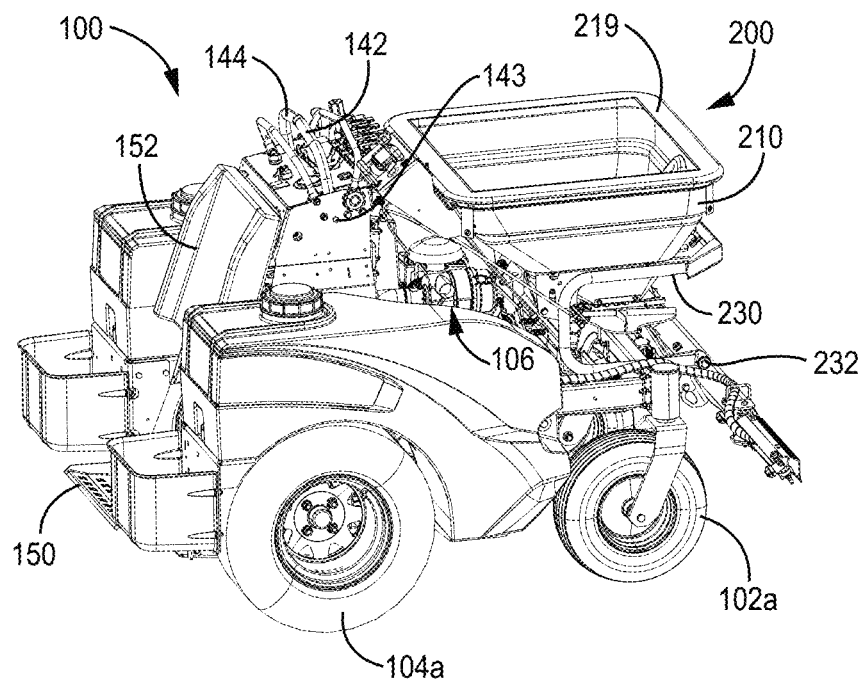
FIG. 2 is a second perspective view of the example implementation of FIG. 1.

The current disclosure is generally directed to a hopper assembly. In some implementations the hopper assembly is a component of a spreader device, which is the example implementation described herein. The spreader device can have a variety of implementations consistent with the current disclosure. FIGS. 1-3 are consistent with some example implementations of a hopper assembly of a spreader device in a riding vehicle. FIGS. 1 and 2 are alternate perspective views of the example maintenance vehicle 100, and FIG. 3 is a side view of the example maintenance vehicle 100. The maintenance vehicle 100 is generally configured to be propelled along a ground surface 50 (denoted in FIG. 3) and spread granular or liquid material across the ground surface 50.

The maintenance vehicle 100 generally has a frame 130 (of which a portion is visible) that is configured to support various vehicle components. The frame 130 is generally configured to be propelled across the ground surface 50 (FIG. 3). In particular, ground engaging members 104 and 102 are disposed on the vehicle frame 130. Here the ground engaging members are drive wheels 104 and caster wheels 102, but in some embodiments the ground engaging members can be tracks, rollers, and/or other types of wheels. The drive wheels 104 are generally in communication with a prime mover 106 (e.g., internal combustion engine or electric motor(s)) that is configured to selectively propel the vehicle 100 across the ground.

A left and a right ground engaging drive wheel 104 may be rotatably coupled to left and right sides of a rear portion of the vehicle 100, respectively. The drive wheels 104 may be independently powered by the prime mover 106 (e.g., via one or more hydraulic motors, transmissions, or the equivalent) so that they may be driven independently of one another. The drive wheels 104 are configured to propel the vehicle 100 over the ground surface 50 and control the vehicle's direction. This permits spin or skid type turning in a zero radius turn manner by rotating one drive wheel 104 in a forward direction while simultaneously rotating the other drive wheel 104 in a reverse direction.

Although the illustrated vehicle 100 has the drive wheels 104 in the rear, this configuration is not limiting. For example, other embodiments may reverse the location of the wheels, e.g., drive wheels in front and caster wheels in back. Moreover, other configurations may use different wheel configurations altogether, e.g., a tri-wheel configuration or a conventional front-wheel-steering configuration. Accordingly, other embodiments are possible without departing from the scope of the invention.

In the current example, the vehicle 100 is configured as a stand-on vehicle. As such, a standing platform 150 (FIGS. 2-3) is coupled to the vehicle frame 130. The standing platform 150 is adapted to support a standing operator. A support pad 152 (FIG. 2) can be coupled to the vehicle 100 that is configured to support the legs of standing operator positioned on the standing platform 150. In some embodiments, the standing platform 150 is pivotably mounted on the vehicle 100. The standing platform 150 and/or the support pad 152 can be consistent with components disclosed in U.S. Pat. No. 8,262,104, which is incorporated by reference herein. In some other embodiments, the vehicle has a seat to accommodate a seated operator instead of a standing operator.

The vehicle 100 has a control panel 140 by which the vehicle 100 is directed and controlled by an operator. The control panel 140 is in operative communication with the prime mover 106. The control panel 140 can have one or more handles 142, 144 that are configured to selectively propel and direct vehicle propulsion. In some embodiments a first handle 142 and a second handle 144 extend outward from the vehicle frame 130 and are each configured to be manually translated relative to the vehicle frame 130 to control operation of the vehicle 100. In the example depicted, the first handle 142 and the second handle 144 are each manually pivotable about a pivot. The first handle 142 has a first pivot 143 (best visible in FIG. 2) and the second handle 144 has a second pivot 145 (visible in FIG. 3). The first handle 142 and the second handle 144 are manually translated about their respective pivots 143, 145 to control operation of the vehicle 100.

In some embodiments, the first handle 142 and second handle 144 can be considered a twin lever control panel, where translation of each handle 142, 144 controls the speed and rotational direction of a corresponding drive wheel 104(*a*), 104(*b*). In this example, translation of the first handle 142 controls a first drive wheel 104(*a*) and translation of the second handle 144 controls a second drive wheel 104(*b*). A drive wheel is considered to "correspond" to a particular handle when it is located on the same side of the vehicle, such that a drive wheel on the right side of the vehicle corresponds to a handle on the right side of the vehicle.

The vehicle 100 can have handles with other configurations as well. In some embodiments, a handle can be configured as a steering wheel. The vehicle 100 can have various alternative and additional controls that can be used by the operator to manipulate function of the vehicle 100. The one or more handles 142, 144 and/or various other controls of the control panel 140 are configured to be accessible to the operator positioned on the standing platform 150. In embodiments where the vehicle has a seat instead of a standing platform, the one or more handles 142, 144 and other system controls are configured to be accessible to the seated operator.

In alternative embodiments, the vehicle can be a riding vehicle or a walk-behind vehicle. In some embodiments the vehicle can be non-powered (and, as such, can lack a prime mover 106) and is not self-propelled. In such embodiments, the vehicle can be configured to be attached to a powered vehicle for use in grounds maintenance. For example, the vehicle frame can have a hitch that is configured to detachably couple to a self-propelled vehicle.

Figure 4:
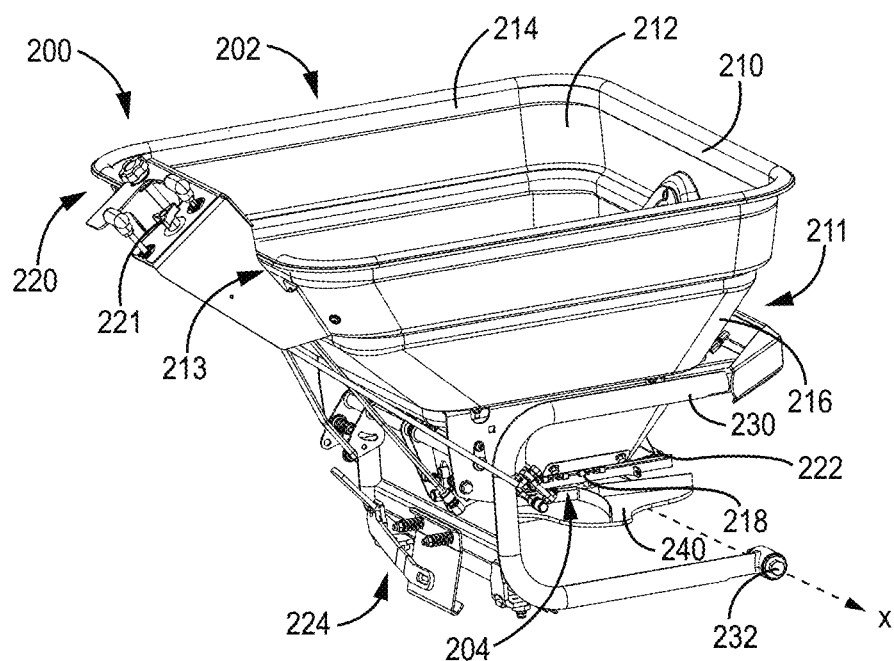
FIG. 4 is an example hopper assembly consistent with various embodiments.
Figure 5:
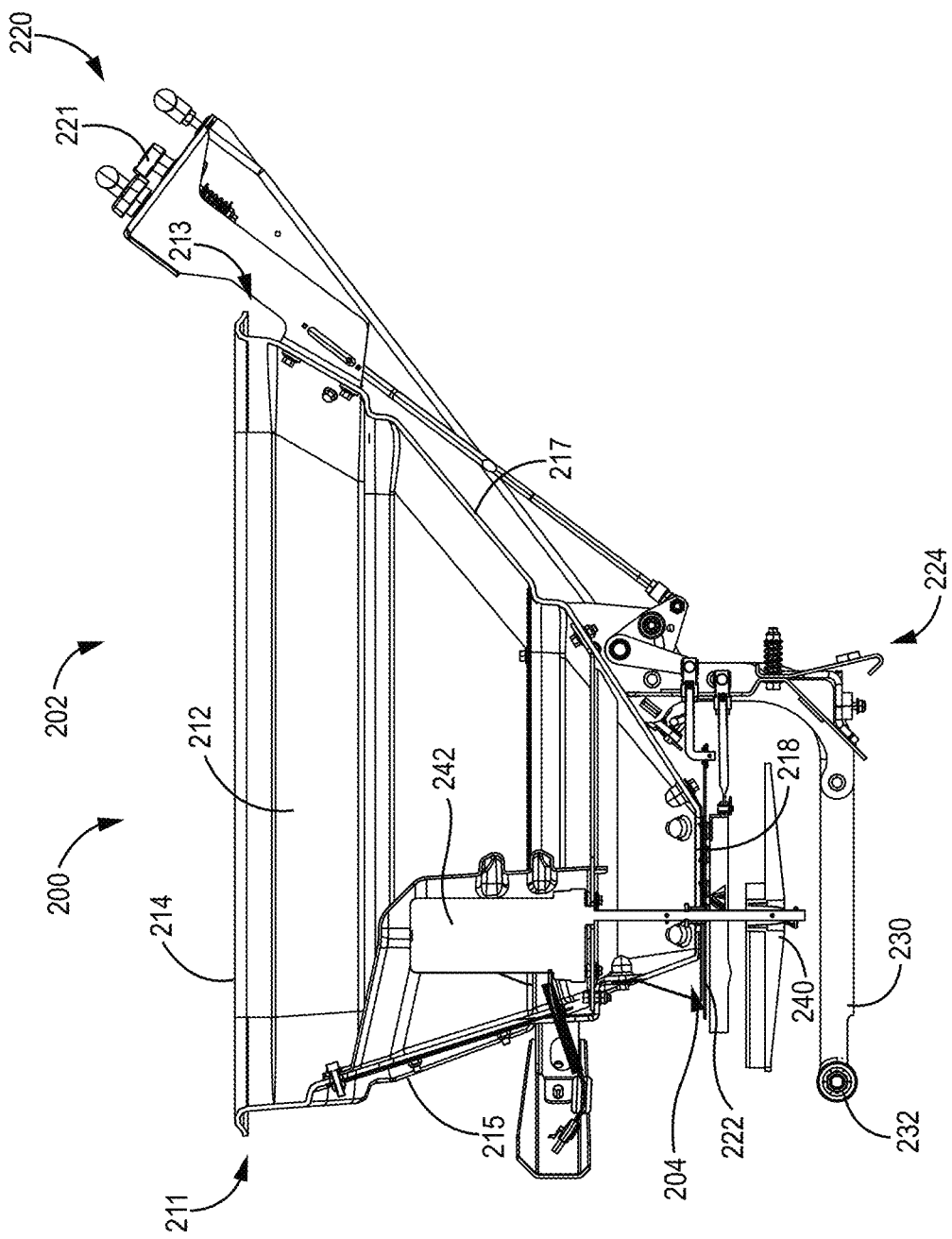
FIG. 5 is a cross-sectional view of an example hopper assembly consistent with FIG. 4.

The maintenance vehicle 100 generally has a hopper assembly 200 coupled to the vehicle frame 130. The hopper assembly 200 is generally configured to store material for transport across a ground surface 50. In some embodiments, the hopper assembly 200 is configured to distribute bulk material across a ground surface 50, such as where the hopper assembly is a component of a spreader device. In such embodiments, the maintenance vehicle 100 is considered a spreader vehicle. The hopper assembly 200 generally has a hopper 210. FIG. 4 depicts a perspective view of an example hopper assembly 200 consistent with the example implementations depicted herein and FIG. 5 depicts a cross-sectional view of the example hopper assembly 200, which can be viewed in conjunction with FIGS. 1-3 for the following description.

The hopper 210 is generally configured to store the bulk material that is to be distributed across the ground surface. The hopper 210 defines a hopper volume 212 and a loading opening 214 (particularly visible in FIG. 4) through which bulk material is loaded into the cavity. The loading opening 214 is generally defined towards a top end 202 of the hopper 210, where the "top end" is the top end of the hopper 210 when the hopper 210 is in an operating position, or operating orientation, as shown in FIGS. 1-2, which will be described in more detail below. In some embodiments, such as where the hopper assembly 200 is consistent with a spreader device, the hopper 210 also defines a discharge opening 218 towards the bottom end 204 of the hopper 210 (when the hopper assembly 200 is in an operating position) that is configured to allow the discharge of the bulk material stored in the hopper 210 under gravity. The hopper volume 212 generally extends between the top end 202 and the bottom end 204 of the hopper 210. In embodiments where a discharge opening 218 is defined by the hopper 210, the hopper volume 212 extends between the loading opening 214 and the discharge opening 218. The hopper assembly 200 can have a hopper cover 219 (FIGS. 1-3) that is removably disposed across the loading opening 214. The hopper cover 219 is generally configured to contain bulk material in the hopper 210 and obstruct foreign materials from entering the hopper 210 through the loading opening 214.

In various embodiments the hopper 210 has at least one sidewall 216 that extends between the top end 202 and the bottom end of the hopper 210 around the hopper volume 212. The at least one sidewall 216 generally tapers from top end 202 towards the bottom end 204. In the examples consistent with the currently described figures, the at least one sidewall 216 extends between the loading opening 214 and the discharge opening 218 around the hopper volume 212. The at least one sidewall 216 generally tapers from the loading opening 214 towards the discharge opening 218 to assist the bulk material in progressing towards the discharge opening 218 under the force of gravity.

Furthermore, in various embodiments, the hopper volume 212 is generally asymmetric. In various embodiments the hopper volume 212 has a center of gravity that is closer to a rear end 213 than a front end 211 of the hopper. Such a configuration may advantageously improve the stability of the vehicle 100. In various embodiments, the hopper 210 has a front inclined sidewall 215 defining the front end of the hopper 210 and a rear inclined sidewall 217 defining the rear end 213 of the hopper 210. In various embodiments, the rear inclined sidewall 217 has a slope that is less than the opposite of the slope of the front inclined sidewall 215. For purposes of the present disclosure, the slope of the sidewalls is defined herein to be the average slope of the sidewall from the top end 202 (such as at the end defining the loading opening 214) to the bottom end 204 (such as the end defining the discharge opening 218).

The hopper assembly 200 is generally pivotably coupled to the vehicle frame 130 such that the hopper 210 and other components of the hopper assembly 200 are pivotable relative to the vehicle 100. The hopper assembly 200 has a coupling end 232 that is configured to pivotably couple to the vehicle frame 130. The hopper assembly 200 defines a pivot axis x (see FIG. 4) about which the hopper 210 is configured to pivot relative to the vehicle frame 130. The hopper assembly 200 can be pivotably coupled to the vehicle frame 130 with the use of a bolt, hinge, or through other approaches known in the art. It is noted that in some embodiments, the hopper 210 of the hopper assembly 200 is directly pivotably coupled to the vehicle frame 130, meaning that the hopper 210 is coupled to the vehicle frame 130 without intervening components (except for a fastener that may couple to hopper 210 to the vehicle frame 130).

In some examples, the hopper assembly 200 has a hopper frame 230. The hopper frame 230 is generally configured to couple the hopper 210 and other components of the hopper assembly 200 to the vehicle frame 130. The hopper frame 230 is generally fixed to the hopper 210. In some examples including the one depicted, the hopper frame 230 is pivotably coupled to the vehicle frame 130 such that the hopper 210 and other components of the hopper assembly 200 are pivotable relative to the vehicle 100. The hopper frame 230 has a coupling end 232 that is configured to pivotably couple to the vehicle frame 130. The hopper frame 230 defines a pivot axis x about which the hopper frame 230 is configured to pivot relative to the vehicle frame 130. The hopper frame 230 can be pivotably coupled to the vehicle frame 130 with the use of a bolt, hinge, or through other approaches known in the art. It is noted that, in some embodiments, a hopper frame 230 can be omitted.

In some embodiments, the hopper assembly 200 is configured to pivot outwardly from the rest of the vehicle 100. In the current example, the pivot axis x extends across a front end 101 of the vehicle 100 (FIG. 1). The hopper assembly 200 is configured to pivot about the pivot axis x in a forward direction relative to the maintenance vehicle 100. The pivot axis x can be parallel to the front end of the vehicle 100. In some other embodiments the pivot axis can extend parallel to a side of the vehicle 100. In such embodiments, the hopper assembly 200 can be configured to pivot outward from the side of the vehicle 100.

The hopper assembly 200 is generally configured to pivot between an operating position, which is the position in which the hopper assembly 200 is configured to operate (depicted in FIGS. 1 and 2), and a maintenance position (or maintenance orientation), which is the position in which the hopper assembly 200 is not configured to operate (depicted in FIG. 3). The maintenance position may facilitate various maintenance operations on the hopper assembly 200 and/or the vehicle 100. The operating position can be at least 45 degrees from the maintenance position. In some embodiments the operating position is at least 60 or 75 degrees from the maintenance position. In some embodiments the operating position is about 90 degrees from the maintenance position. The operating position can be greater than 90 degrees in further embodiments. In an example, the operating position is between 100 degrees and 120 degrees from the maintenance position.

In various embodiments the hopper assembly 200 has a latching mechanism 224 (FIG. 4) that is configured to maintain the hopper assembly 200 in an operating position. In various embodiments the latching mechanism 224 releasably couples the hopper assembly 200 (such as the hopper 210 or the hopper frame 230) to the vehicle frame 130. The latching mechanism 224 can be manually released by a user to enable pivoting of the hopper assembly 200 to a maintenance position.

In some embodiments, the hopper assembly 200 can have one or more pivot limiting structures that at are configured to limit pivoting of the hopper 210 beyond the maintenance position. As examples, a strap, lanyard, or rod can be positioned to physically obstruct pivoting of the hopper 210 beyond the maintenance position. The pivot limiting structure accommodates pivoting of the hopper assembly 200 from the operating position to the maintenance position. In some embodiments, when the hopper assembly 200 is in the operating position or being pivoted towards the maintenance position, the pivot limiting structure is not under tension. However, in some such embodiments, when the hopper assembly 200 is pivoted to the maintenance position, the pivot limiting structure is put under tension that opposes the force of gravity (and other forces) on the hopper assembly 200 to prevent further pivoting of the hopper assembly 200 beyond the maintenance position. In some embodiments, a pivot limiting structure can have a first end coupled to the vehicle frame 130 and a second end coupled to the hopper assembly 200. In some other embodiments the pivot limiting structure can be entirely coupled to the vehicle frame 130. In such embodiments the pivot limiting structure can be disposed along the pivot pathway of the hopper assembly to abut the hopper assembly 200 when the hopper assembly 200 is pivoted to the maintenance position.

In the operating position, the hopper assembly 200 generally extends over the prime mover 106 of the vehicle (see FIGS. 1 and 2). In various embodiments, the hopper assembly 200 obstructs the prime mover 106 in the operating position. In the maintenance position, the hopper assembly 200 is pivoted away from the position extending over the prime mover 106, thereby exposing at least a top portion of the prime mover 106 (see FIG. 3). In particular, in the maintenance position, the hopper assembly 200 does not extend over the prime mover 106. Such a configuration may advantageously allow the prime mover 106 to be accessed by a user to engage in maintenance operations on the prime mover 106. Furthermore, in the operating position, the hopper assembly 200 is generally in an orientation to facilitate loading, storing, and transport of bulk material (and potentially distribution of bulk material) on a ground surface. In the maintenance position, the hopper assembly 200 is an in orientation that may facilitate cleaning or other maintenance operations on the hopper assembly 200. For example, in a maintenance position the hopper 210 can be pivoted such that the loading opening 214 and the hopper volume 212 faces outward from the front end 101 of the vehicle 100.

The hopper assembly 200 can have various additional components. For example, where the hopper assembly 200 is incorporated in a spreader device, the hopper assembly 200 can have components that enable the distribution of bulk material on a ground surface 50. For example, the hopper 210 can have a discharge opening 218 that is configured to release bulk material stored in the hopper 210. The spreader device can be consistent with a drop spreader or a broadcast spreader, as examples. When the spreader device is consistent with a broadcast spreader, a broadcasting component such as a spreader disk or belt is configured to receive the bulk material from the discharge opening 218 of the hopper 210 via gravity. The broadcasting component is further configured to apply a lateral force to the received bulk material to fling (or broadcast) the received bulk material outward from the hopper 210. Spreader devices consistent with a drop spreader can omit a broadcasting component such that the bulk material is configured to drop from the discharge opening 218 under the force of gravity. Both broadcast spreaders and drop spreaders can have intervening components to direct and regulate the flow of the bulk material from the discharge opening towards the ground surface such as a chute, platform, screen/lattice, and adjustment mechanisms (examples of which are discussed below).

In the current example, the hopper assembly 200 is a component of a spreader device that has a spreader disk 240 positioned vertically below the discharge opening 218 when the hopper assembly 200 is in its operating position. The spreader disk 240 is coupled to a motor 242 (visible in FIG. 5) that is configured to spin the spreader disk 240 at a selected speed. In the current example the motor 242 is coupled to the hopper 210 and more particularly is housed by the hopper 210. After the bulk material is discharged through the discharge opening under the force of gravity, the bulk material comes into contact with the spinning spreader disk 240, which launches the bulk material outward around the spreader disk 240 to eventually land on the ground surface 50.

The hopper assembly 200 can have a hopper controller 220. The hopper controller 220 is in operative communication with the hopper assembly 200. The hopper controller 220 is generally configured to allow a user to control operation of the hopper assembly 200. The hopper controller 220 can be fixed relative to the hopper 210. In the current example, the hopper controller 220 is fixed directly to the hopper 210. In some other embodiments where a hopper frame is employed, the hopper controller 220 can be directly fixed to the hopper frame 230. The hopper controller 220 is configured to be manually manipulated by a user for adjusting the hopper assembly 200, where "manual manipulation" is used to include interacting with an electrical and/or computer interface. In the current example, the hopper controller 220 has one or more adjustment mechanisms that are each configured to adjust a particular function of the hopper assembly 200. Each adjustment mechanism is part of a mechanical communication chain that is ultimately in operative communication with an adjustable component of the hopper assembly 200. The mechanical communication chain is defined to include both mechanically and electrically driven components.

For example, a first adjustment mechanism 221 that is configured to adjust the size of the discharge opening 218 of the hopper 210. The first adjustment mechanism 221 can be a manually engageable interface, such as a knob, handle, button, dial, touch screen, or the like. The size of the discharge opening 218 can define the rate of release of the bulk material stored in the hopper 210. In particular, a first mechanical communication chain extends from the first adjustment mechanism 221 to an adjustment plate 222 extending across the discharge opening 218 of the hopper 210. The first adjustment mechanism 221 is configured to translate the adjustment plate 222 across the discharge opening 218 to select the area of the discharge opening 218 that is available for discharging the bulk material.

In various embodiments the first mechanical communication chain extending from the first adjustment mechanism 221 to the adjustment plate 222 is a series of rigid linkages. In some embodiments the first mechanical communication chain lacks non rigid linkages such as cables, chains, and the like. Lacking such non rigid linkages may advantageously increase reliability of the mechanical communication chain. As mentioned above, in some embodiments the first mechanical communication chain incorporates electrically driven components as well as mechanically driven components.

In its operating position, the hopper controller 220 is adjacent the control panel 140 of the vehicle 100 (see FIGS. 1 and 2). Such a configuration generally enables a user who has access to the control panel 140 to also have access to the hopper controller 220. In various embodiments, the hopper controller 220 abuts the control panel 140 when the hopper assembly 200 is in an operating position. However, because the hopper controller 220 is fixed relative to the hopper 210, the hopper controller 220 pivots with the hopper 210 about the pivot axis x. As such, when the hopper 210 is in a maintenance position, the hopper controller 220 is distant from the control panel 140 (relative to when the hopper 210 is in its operating position).

Fixing the hopper controller 220 to the hopper 210 may have a variety of advantages. In some examples, fixing the hopper controller 220 to the hopper 210 may simplify the process of pivoting the hopper 210 into a maintenance position by eliminating the need to disconnect the hopper controller 220 from the hopper 210. Further, fixing the hopper controller 220 to the hopper 210 may advantageously avoid the use of non-rigid linkages along the mechanical communication chains extending from the hopper controller 220, which may improve reliability and life of the mechanical communication chain.

In some embodiments, the position of the spreader disk 240 is fixed relative to the hopper 210 such that the spreader disk 240 pivots with the hopper 210. In some such embodiments, when the hopper assembly 200 is in its maintenance position, the spreader disk 240 can be positioned between the hopper 210 and the prime mover 106 in a longitudinal direction, where the longitudinal direction is the direction extending between the rear end of the vehicle and the front end of the vehicle.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A maintenance vehicle comprising:
a vehicle frame;
drive wheels rotatably coupled to the vehicle frame;
a prime mover coupled to the vehicle frame, wherein the prime mover is in operative communication with the drive wheels; and
a hopper assembly comprising a hopper having a loading opening and a discharge opening,
wherein the hopper assembly is pivotably coupled to the vehicle frame, wherein the hopper assembly is pivotable about a pivot axis between a maintenance position and an operating position.

2. The maintenance vehicle of claim 1, further comprising a control panel fixed to the vehicle frame, wherein the control panel is in operative communication with the prime mover; and
a hopper controller fixed relative to the hopper, wherein the hopper controller is adjacent the control panel when the hopper is in the operating position and the hopper controller is distant from the control panel when the hopper is in the maintenance position.

3. The maintenance vehicle of claim 1, further comprising a standing platform coupled to the vehicle frame, the standing platform adapted to support a standing operator.

4. The maintenance vehicle of claim 1, wherein the hopper assembly extends over the prime mover in the operating position and the hopper assembly exposes the prime mover in the maintenance position.

5. The maintenance vehicle of claim 2, wherein the hopper controller is configured to adjust a rate of release of a bulk material from the hopper.

6. The maintenance vehicle of claim 1, wherein the hopper assembly is configured to pivot in a forward direction relative to the maintenance vehicle.

7. The maintenance vehicle of claim 1, wherein the hopper has a front end and a rear end and a hopper volume extending between a top end and a bottom end, wherein the hopper volume is asymmetric and has a center of gravity that is closer to the rear end than the front end.

8. The maintenance vehicle of claim 7, the hopper further comprising a front inclined sidewall and a rear inclined sidewall, wherein the slope of the rear inclined sidewall is less than the opposite of the slope of the front inclined sidewall.

9. The maintenance vehicle of claim 1, wherein the maintenance vehicle is a zero radius turn vehicle.

10. The maintenance vehicle of claim 1, further comprising a spreader disk adjacent to the discharge opening, wherein the spreader disk is positioned vertically below the hopper when the hopper assembly is in an operating position.

11. The maintenance vehicle of claim 10, wherein the spreader disk is fixed to the hopper such that the spreader disk is configured to pivot with the hopper.

12. A maintenance vehicle comprising:
a vehicle frame;
drive wheels rotatably coupled to the vehicle frame;
a prime mover coupled to the vehicle frame, wherein the prime mover is in operative communication with the drive wheels;
a standing platform coupled to the vehicle frame, the standing platform adapted to support a standing operator; and
a hopper assembly comprising a hopper coupled to the vehicle frame, wherein the hopper has a front end and a rear end and a hopper volume extending between a top end and a bottom end,
wherein the hopper volume is asymmetric and has a center of gravity that is closer to the rear end than the front end, and wherein the hopper defines a loading opening and a discharge opening.

13. The maintenance vehicle of claim 12, wherein the hopper assembly is pivotably coupled to the vehicle frame, wherein the hopper assembly is pivotable about a pivot axis between a maintenance position and an operating position.

14. The maintenance vehicle of claim 13, further comprising a hopper controller fixed relative to the hopper and a control panel fixed to the vehicle frame, wherein the control panel is in operative communication with the prime mover, the hopper controller is in operative communication with the hopper assembly, and the hopper controller is adjacent the control panel when the hopper is in the operating position and the hopper controller is distant from the control panel when the hopper is in the maintenance position.

15. The maintenance vehicle of claim 13, wherein the hopper assembly obstructs the prime mover in the operating position and the hopper assembly exposes the prime mover in the maintenance position.

16. The maintenance vehicle of claim 13, wherein the hopper assembly is configured to pivot in a forward direction relative to the maintenance vehicle.

17. The maintenance vehicle of claim 12, the hopper further comprising a front inclined sidewall and a rear inclined sidewall, wherein the slope of the rear inclined sidewall is less than the opposite of the slope of the front inclined sidewall.

18. The maintenance vehicle of claim 12, wherein the maintenance vehicle is a zero radius turn vehicle.

19. The maintenance vehicle of claim 17, further comprising a spreader disk adjacent to the discharge opening, wherein the spreader disk is positioned vertically below the hopper when the hopper assembly is in an operating position.

20. The maintenance vehicle of claim 19, wherein the spreader disk is fixed to the hopper.

21. A maintenance vehicle comprising:
a vehicle frame;
drive wheels rotatably coupled to the vehicle frame;
a prime mover coupled to the vehicle frame, wherein the prime mover is in operative communication with the drive wheels;

a standing platform coupled to the vehicle frame, the standing platform adapted to support a standing operator;

a hopper assembly comprising a hopper pivotably coupled to the vehicle frame, wherein the hopper has a front end and a rear end and a hopper volume extending between a top end and a bottom end, wherein the hopper assembly is pivotable about a pivot axis between a maintenance position and an operating position;

a hopper controller fixed relative to the hopper; and a control panel fixed to the vehicle frame, wherein the control panel is in operative communication with the prime mover, the hopper controller is in operative communication with the hopper assembly, and the hopper controller is adjacent the control panel when the hopper is in the operating position and the hopper controller is distant from the control panel when the hopper is in the maintenance position.

\* \* \* \* \*